United States Patent [19]

Barclay et al.

[11] 4,228,431

[45] Oct. 14, 1980

[54] ELECTROCHROMIC DISPLAY DEVICE

[75] Inventors: Donald J. Barclay, Winchester; Colin L. Bird, Eastleigh; Michael H. Hallett, Eastleigh; David H. Martin, Eastleigh, all of England

[73] Assignee: International Business Machines Corporation, Armonk, N.Y.

[21] Appl. No.: 860,265

[22] Filed: Dec. 13, 1977

[30] Foreign Application Priority Data

Dec. 22, 1976 [GB] United Kingdom ............... 53515/76

[51] Int. Cl.[2] ........................... G06F 3/14; G09F 9/32

[52] U.S. Cl. .................................... 340/719; 340/785; 350/357

[58] Field of Search .............. 340/324 M, 324 R, 336, 340/763, 785; 350/357; 58/50 R

[56] References Cited

U.S. PATENT DOCUMENTS

| | | | |
|---|---|---|---|
| 3,950,077 | 4/1976 | Jasinski | 340/785 |
| 4,092,637 | 5/1978 | Barclay et al. | 340/324 R |
| 4,112,333 | 9/1978 | Asars et al. | 340/719 |
| 4,114,070 | 9/1978 | Asars | 340/719 |

*Primary Examiner*—Marshall M. Curtis
*Attorney, Agent, or Firm*—Bernard N. Wiener

[57] ABSTRACT

According to the disclosure, electrochromic display apparatus is provided, comprising, an electrolyte containing an electrochromic material, a plurality of display electrodes in the electrolyte, the display electrodes being connected in at least one group to enable selection of display electrodes, means for selecting at least some display electrodes, means to effect deposition of a visible coating of colored species derived from the electrochromic material onto the selected display electrodes, and means to effect deposition of an invisible coating of the colored species onto all unselected display electrodes, whereby the potentials of selected and unselected display electrodes are equalized.

4 Claims, 1 Drawing Figure

ELECTROCHROMIC DISPLAY DEVICE

BACKGROUND OF THE INVENTION

This invention relates to an electrochromic display device, which is a device which operates to produce a display by the electrochemically reversible deposition of coloured species on selected display electrodes.

In British patent specification No. 1,376,399, viologen has been suggested as a suitable electrochromic material, in particular, heptyl viologen dibromide which is colourless in solution but on passage of electric current "plates out" a purple species on the display electrode. However, the present invention is not restricted to this material, practice of the invention being of general application. The type of display to which the invention applies is one in which groups of display electrodes are connected together for the purpose of selecting at which electrodes the display effect is to be achieved. For example, in one common type of display, many dot-shaped electrodes are arranged in rows and columns. A selected display image is generated by directing current to selected display electrodes so that the image is formed by a pattern of coloured dots. For selection and isolation of the display electrodes, each electrode is associated with a three terminal electronic switch such as a transistor. All control electrodes of the switches associated with respective rows of display electrodes are connected to respective row conductors. The display electrodes of each column are connected in parallel through their respective switches and a respective column conductor to drive and selection circuitry for that column. It is this parallel connection of display electrodes in groups in an electrochromic display which gives rise to the problem which practice of the present invention aims at avoiding. The group in the arrangement just described is the display electrodes of the same column but it can be any arrangement in which current paths exist between a plurality of display electrodes. Thus, groups of display electrodes may be connected together so that selected letters or digits may be displayed by selecting some of the electrodes of the connected group. For example, a rectangular array of 7×9 dot-shaped display electrodes can form a single character position, all the electrodes being connected through respective transistor switches to a common drive circuitry. The transistor control electrodes can be connected to selection circuitry such that letters or numbers can be displayed by colouring of selected display electrodes in response to energizing selected control electrodes.

As described in British patent specification No. 1,376,399, the coloured species is formed at the display electrode, acting as a cathode, by reduction of uncoloured viologen, the reverse process taking place at a counter electrode, the anode. The formation of coloured species at a display electrode is called herein a write operation, and the removal of such species, by the process of oxidation, an erase operation. A display electrode carrying coloured species will be referred to as written.

When a display electrode is written, sufficient charge is supplied to provide a clearly visible deposit of coloured species. This involves coating the electrode with some tens of molecular layers of the species. One or two layers of the species are not visible. Since the amount of coloured species deposited at an electrode depends on the amount of charge supplied to the electrode, an electrochromic display device is particularly suitable for providing variable intensity displays because the colour shade at an electrode is accurately controllable. A written electrode is at a well-defined potential, given by the Nernst equation $$E = E_o + k \cdot \ln (p/c)$$

where $E_o$ and k are constants, c is the bulk concentration of electrochromic material in the electrolyte, and p is the proportion of electrode covered by the deposited species. It follows that E is a maximum when the electrode is fully covered and does not change however much further species is deposited on the electrode. In contrast, an unwritten electrode is at an undefined potential, less than E, determined by the components of the electrolyte.

A potential difference thus exists between the written and unwritten electrodes and, among those electrodes connected in a group through electronic switches, transfer of charge from the written to the unwritten electrodes takes place, against the resistance of the electronic switches, and continues until the unwritten electrodes carry a monolayer of electrochromic material and the potentials of the written and unwritten electrodes are equalized. As charge is removed from the written electrodes, the species deposited on these electrodes is returned to solution. Although the monolayers of electrochromic material on the unwritten electrodes are invisible, the charge transfer, which is called the charge leakage herein, has the undesirable effect of bleaching the display on the written electrodes. The amount of bleaching is not constant since it depends on the ratio of written to unwritten display electrodes in a group. For example, if 1000 equal area display electrodes are connected in a group, if it requires 50 micro-Coulombs/$cm^2$ to deposit a monolayer of electrochromic material, and if 2.5 milli-Coulombs/$cm^2$ are used to write at an electrode, and if less than 20 electrodes are written, the charge leakage will dissipate the written charge to result in an invisible monolayer on the written electrodes. However, even if more than 20 electrodes are written, the bleaching effect reduces the contrast between written and unwritten electrodes, especially in those groups of electrodes where only a few are written and, where clear contrast is usually desirable.

The problem of charge leakage can also be regarded from the point of view of the circuit designer. In order to achieve a desired contrast between written and unwritten electrodes, it would be necessary to know how many unwritten electrodes there are in each group in order to determine the charge to be supplied to the electrodes to be written. For a given group of electrodes, this number would vary from image to image. The drive circuitry must then contain current generators which are accurately controllable to deliver varying amounts of current according to the image to be displayed. Such a requirement greatly increases the complexity and cost of the drive circuitry.

SUMMARY OF THE INVENTION

It is an object of the invention to overcome the problem of charge leakage by preventing it.

According to the invention we provide electrochromic display apparatus, comprising, an electrolyte containing an electrochromic material, a plurality of display electrodes in the electrolyte, the display electrodes being connected in at least one group to enable selection of display electrodes, means for selecting at least some display electrodes, means to effect deposition of a visible coating of coloured species derived from the electrochromic material onto the selected display electrodes, and means to effect deposition of an invisible coating of the coloured species onto all unselected display electrodes, whereby the potentials of selected and unselected display electrodes are equalised.

As has been noted above, a few layers of coloured species are invisible. The unwritten electrodes coated with an invisible layer of coloured species are called fat zeroes.

DESCRIPTION OF THE EMBODIMENT

Figure 1:
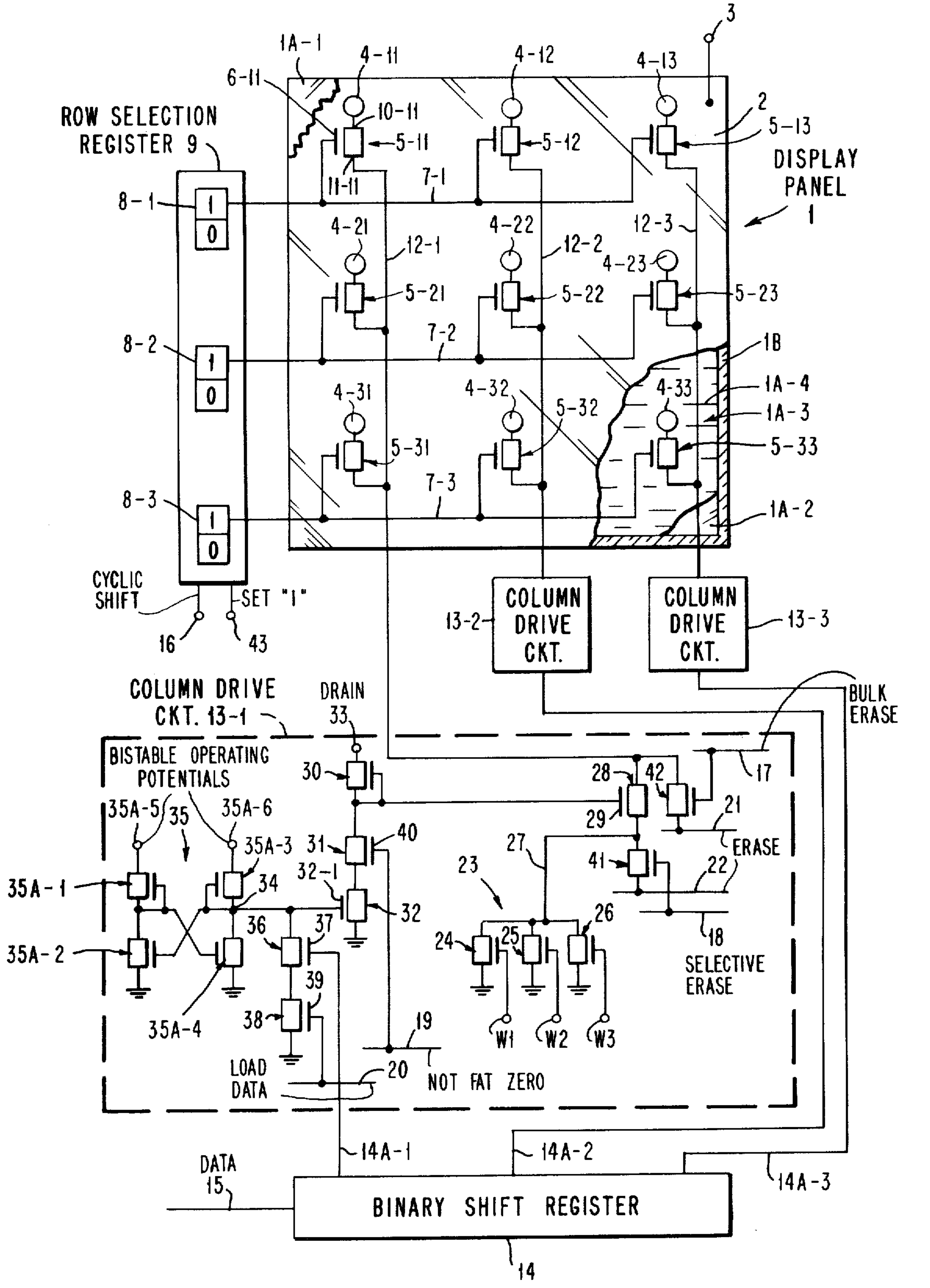
FIG. 1 is a schematic diagram showing an exemplary embodiment of an electrochromic display apparatus according to the invention.

The invention will further be explained, by way of example, with reference to the drawing, in which the only figure is a schematic diagram showing an exemplary embodiment of an electrochromic display apparatus according to the invention.

Referring to the drawing, a display panel 1 comprises two sheets of dielectric material 1A-1 and 1A-2, such as glass, of which at least one sheet 1A-1 is transparent, which sheets are spaced apart and sealed at the edges by insulating material 1B to define a hermetic chamber 1A-3 filled with a solution of electrochromic material 1A-4. The transparent sheet 1A-1 supports a transparent counterelectrode 2, such as a tin oxide layer, which is connected to a terminal 3 held at a suitable potential. The other sheet 1A-2 carries an array of display electrodes 4 made of gold or platinum or some other electrochemically inert metal or combination of metals. As shown, the display electrodes 4 are dot-shaped and are arranged in rows and columns. However, the practice of the invention is not limited to such electrode shape and arrangement. For convenience, only nine display electrodes 4 have been shown arranged in three rows and three columns. It should be understood that a practical embodiment of a display could include about one thousand rows, each containing about one thousand display electrodes 4. Each display electrode 4 is connected through the supporting sheet 1A-2 to a respective electronic switch 5, shown as a field effect transistor, although other transistor types or other electronic switches such as chalcogenide glass could be used. The gate electrodes 6 of the switches 5 connected to display electrodes 4 of the same row are connected in common to respective row conductors 7. The row conductors 7 are connected to respective bistable stages 8 of a row selection register 9.

The drain electrode 10 of each switch 5 is connected to the associated display electrode 4, and the source electrodes 11 of those switches 5 connected to the display electrodes 4 of the same column are connected in common to a respective column conductor 12. The potential of each column conductor 12 is determined by a column drive circuitry unit 13. The circuitry unit 13 is shown in detail for only one column. Column drive circuitry 13 is responsive to the contents of a binary shift register 14 of conventional design which staticizes data serially presented on conductor 15. The respective bistable stages of shift register 14 are connected to respective column drive circuitry units 13 by connection 14A.

Operation of the electrochromic display apparatus will now be described in general terms without taking into account application of the invention or the details of the column drive circuitry.

Row selection register 9 normally operates as a cyclic shift register in response to a signal on a terminal 16 which causes a signle one bit to be circulated therein cyclically. FIG. 1 shows each row conductor 7 as joined to a block labelled "1" of the corresponding stage 8 of the row selection register 9. This indicates that when a stage is in the "1" state the corresponding row conductor 7 is energized. Energization of a row conductor 7 causes energization of the gate electrodes of that row and the energization signal is chosen such that it causes the switches 5 to be capable of passing current. Therefore, the effect of the circulation of the one bit through register 9 is to cause rows of switches 5 to close successively, only one row being closed at a time. As a row of switches is closed, bistable circuits in the column drive circuitry are set to "1" or "0" states to determine whether write signals are to be applied to the column conductors. For example, if only the middle display electrode of a row is to be activated, only the bistable circuit in the middle column drive circuitry unit 13-2 is set to "1", the bistable circuits in the other units being set to "0". Bistable circuits in the "1" state gate the write signal to the column conductor 12 to which the bistable circuit of the circuitry unit 13 is connected. The write signal is passed to the display electrode 4 in the row with the closed switch 5. The bistable circuits are set according to the data in register 14. Therefore, the sequence of operations is: shift data defining which display electrodes of a row are to be written into register 14, set bistables in the column drive circuitry according to the data in register 14 and simultaneously close the switches 5 of the row to which the data relates, and finally, supply a write signal to all column drive circuitry units 13. This sequence is repeated for all rows in synchronism with the circulation of the one bit through row selection register 9.

As has been explained, the operation of writing involves depositing a clearly visible layer of coloured species on a display electrode 4 and this results in the display electrode being established at a well-defined potential relative to an unwritten display electrode. Unless something is done to prevent it, there will follow leakage of charge with consequent dissipation of the coloured species from the written electrodes 4 to those unwritten electrodes 4 which are connected in parallel to the written electrodes. The leakage stops when the potentials of the written and unwritten electrodes have been equalized, i.e., when at least a monolayer of coloured species is deposited on the unwritten electrodes. In FIG. 1, the electrodes in the respective columns form respective groups of parallel connected electrodes between which charge leakage can occur. Practice of the invention prevents charge leakage by causing at least a molecular layer of coloured species to be deposited on each electrode. Where the display electrode is to be written, sufficient coloured species is deposited to be clearly visible. An unwritten display electrode carries an invisible layer of coloured species, i.e., a fat zero. The potential difference between written and unwritten electrodes is zero and charge leakage does not occur. As will be described, a fat zero is written by gating a write signal to appropriate display electrodes for a shorter time than is required to write a clearly visible layer of coloured species, but practice of the invention is not limited to this particular implementation. For example, the fat zero current source can be different from that of the write current to provide a lower magnitude current for the same time as it takes to write a visible layer of coloured species with a higher magnitude current.

Referring to FIG. 1 of the drawing, each column drive circuitry unit 13 includes field effect transistor circuits for applying write, write fat zero and erase signals to the associated column conductor 12 and a bistable circuit 35, comprising four transistors 35A-1 to 35A-4, for storing a data value derived from a corresponding stage of register 14. Operational potentials for bistable circuit are applied to terminals 35A-5 and 35A-6. Operation of each unit 13 is in response to control signals on control lines common to all the units. These signals are Bulk Erase on line 17, Selective Erase on line 18, Not Fat Zero on line 19, and Load Data on line 20. Electric potential of value suitable to cause removal of deposited coloured species from display electrodes is applied to buses 21 and 22, common to all units 13. Write control circuitry 23 consists of three transistors 24 to 26 connected in parallel between ground or a reference potential and a conductor 27 which is in turn connected through a transistor 28 to column conductor 12. The gate electrodes of transistors 24 to 26 are connected respectively to control terminals W1 to W3. With transistor 28 conductive and one of the switches 5 closed, control signals on any of terminals W1 to W3 create a current path including counterelectrode terminal 3, the electrolyte 1A-4, the display electrode 4 connected to the closed switch 5, column conductor 12, transistor 28 and one or more of the transistors 24 to 26. The amount of current flowing through the path in a given time, and thus the amount of coloured species deposited on the display electrode 4, depends on how many of the transistors 24 to 26 are made conductive by control signals W1 to W3. Maximum colour intensity is obtained when all three transistors are conductive, and minimum colour intensity when only one is conductive. This arrangement of write control circuitry provides a means whereby a variable intensity display can be achieved.

Transistor 28 is controlled by the potential on its gate electrode 29. The source electrode of a transistor 30, which is connected to function as a current source is connected to gate electrode 29, and through transistor 31 and 32 to ground or reference potential. The drain electrode of transistor 30 is connected to a terminal 33 at which a potential suitable to render 28 conductive is applied. As long as transistors 31 and 32 are not conductive, this potential is transmitted to the gate electrode 29 of transistor 28, whereas when both transistors 31 and 32 are conductive, the potential at gate electrode 29 is such as to render transistor 28 non-conductive. Transistor 32 is controlled by the potential on its gate electrode 32-1 which is the potential of node 34 of a bistable circuit 35, of well-known design. The state of the bistable circuit 35 is controlled by the state of corresponding stage of register 14 which controls the conductivity of a transistor 36 by controlling the potential of a gate electrode 37. Conventional reset circuitry is not shown for clarity of illustration. Transistor 36 and a transistor 38 are connected in series between node 34 and ground or a reference potential. The gate electrode 39 of transistor 38 is controlled by the Load Data signal on bus 20. When the Load Data signal is up, the state of bistable circuit 35 depends on whether transistor 36 is or is not conductive. The potentials of the data input circuitry 13 just described are so chosen that when bistable circuit 35 stores a "0", thereby indicating that a write operation is not required, the potential a node 34 is such as to render transistor 32 conductive.

The conductivity of transistor 31 is controlled by the potential at the gate electrode 40 and this is determined by the potential of the Not Fat Zero bus 19. Bus 19 is at such potential as to render transistor 31 conductive except for a short interval of time, which is called herein the fat zero write time. During fat zero write time the non-conductivity of transistor 31 causes gate electrode 29 to be at the potential of terminal 33 with the result that transistor 28 conducts.

To summarise the procedure for generating an image: a row of display electrodes is selected; if it is required to generate a display at a display electrode 4 in a given column of the selected row, node 34 of the column drive circuitry unit 13 of that column is at such potential as to send tr^nsistor 32 non-conducting, and the potential of gate electrode 29 is that of terminal 33, resulting in write current being conducted by transistor 28. However, if it is not required to generate a display at the electrode 4, node 34 is at a potential to send transistor 32 conductive and transistor 31 is also conductive, under the control of the Not Fat Zero signal, except for the fat zero write period when transistor 31 is non-conductive, thereby enabling transistor 28 to pass a write current of predetermined magnitude for the duration of this period. The procedure continues with the selection of the next row of display electrodes.

The current necessary to cause a visible layer of coloured species to be deposited on a display electrode can be supplied in one operation, i.e., a row of display electrodes is selected, sufficient current is supplied to write the selected electrodes of that row, and then the next row is selected. However, it is preferred, to supply the total amount of current needed as a plurality of equal pulses. This provides a faster write time and a gradual fade-in of the image. If there are N such equal pulses, row selection register 9 is cycled N times and each time a row is selected 1/N of the total write current is supplied to the selected display electrodes. With such pulsed writing, there are several ways in which fat zeroes can be generated. In one way, the fat zero write period is distributed equally over the N write cycles, 1/N of the total fat zero write current being supplied to each unselected display electrode on each cycle. Another way involves writing fat zeroes in only one write cycle, which could, for example, be the last of the N cycles. This latter way implies that the length of the fat zero write period is not greater than 1/N of the total write time. The parameters of the write operation depend greatly on the geometry and topography of the display electrodes. However, it has been found for an exemplary practice of this invention that 2.5 milli-Coulombs/$cm^2$ of charge are required to generate a display at an electrode, whereas 200 micro-Coulombs/$cm^2$ of charge suffice to generate a fat zero. Therefore, for this example, the fat zero write period should be 0.08 as long as the full write period, given the same current source. Accordingly, as long as there are no more than ten write cycles in such an exemplary practice of this invention, a complete fat zero write pulse can be fitted into any one of the cycles.

To provide for variable intensity displays, i.e., grey scale, transistors 24 to 26 are selectively operable, as has been explained, to provide variable amounts of current on the column conductors 12, and thus variable amounts of charge on the display electrodes 4. In order accurately to determine the amount of charge deposited during a fat zero write period, it is necessary that a known amount of current be supplied to the column conductors. It is assumed, by way of example, that to write a fat zero only transistor 24 is made conductive by a signal on terminal W1. In order to ensure that transistor 24 and only transistor 24 is conductive during a fat zero write, several arrangements are possible. For example, the state of bistable circuit 35 can be sensed and the signal at terminal W1 generated whenever the state of circuit 35 is "0". In one way of achieving this, it can be arranged that a signal of suitable length and timing is always provided at terminal W1 but that signals are not gated to terminals W2 and W3 unless the circuit 35 is in the "1" state. However, it is preferred, to avoid sampling the state of the bistable circuit 35 to control the write signals. What is done is to supply a fixed amount of charge to every electrode, the fixed amount being that required to write a fat zero, and, where the coloured species is to be visible, also to supply charge in an amount which varies according to the colour intensity required. The fixed amount of charge is written during the fat zero write period so that during this period the write current is fixed whether the display electrode is carrying only a fat zero or a visible layer of coloured species.

The means for generating write signals and the not fat zero control signals are conventional and will not be described in detail. An oscillator provides a sequence of basic timing pulses and these are divided in known manner to provide the write signals. The write signals may be of such length as to provide a written electrode in one operation, or may be such as to provide pulsed writing as described above. With long write signals or where the fat zero write period is distributed over the write periods, the not fat zero signal is derived by dividing the basic timing pulses and inverting the divider output. Where pulsed writing is used in combination with a single fat zero write period, the not fat zero signal length is determined by dividing the basic timing pulses and the signal, which defines a sequence of fat zero write periods is gated by counting the write signals and using every N-th write signal to gate a fat zero signal. As has been stated, these arrangements are conventional and details may be found in standard works on pulse techniques.

During the write operation some charge leakage may take place between written and unwritten rows but such leakage will be negligible.

To complete the description of the FIG. 1, erase facilities will be described. The erase operation involves the dissipation of charge on the display electrodes and is not time dependent provided that a certain minimum time is allotted to the operation to permit complete charge dissipation. A selective erase facility is provided by a transistor 41, Selective Erase control line 18 and erase bus 22. Transistor 41 is connected between transistor 28 and erase bus 22. The Selective Erase control signal line 18 is connected to the gate electrode of transistor 41. Bus 22 is slightly positive relative to the counter electrode 2 potential. For example, if the counterelectrode is at 6 volts, but 22 is at 6.2 volts when transistor 41 is conductive, a display electrode or row of display electrodes is selected for erasure in accordance with the state of register 9 and the bistable circuits 35. This facility is useful for line-by-line erasure, or for erasure of limited fields of an image or alphanumeric display.

An alternative erase procedure is provided by transistor 42, Bulk Erase control line 17 and erase bus 21, which can be connected to bus 22. Transistor 42 is in parallel with transistor 28 relative to column conductor 12. To execute a bulk erase, in which every display electrode is erased simultaneously, all the stages of row selection register 9 are set to the "1" state in response to a signal at a terminal 43, with the result that the gate electrodes of all switches 5 are at a potential enabling the switches to conduct. When the Bulk Erase control line 17 potential is such as to cause transistor 42 to conduct, reverse current flow occurs from all the display electrodes thereby causing removal of any deposited material.

The preferred embodiment has been described by way of example only. The terms row and column are, of course, interchangeable and the invention is applicable to other arrangements of display electrodes and to other means for selecting display electrodes to be written.

What is claimed is:

1. Electrochromic display apparatus, comprising:
an electrolyte containing an electrochromic material,
a plurality of display electrodes in said electrolyte,
said display electrodes being electrically connected in at least one group to enable selection of display electrodes,
means for selecting at least some display electrodes,
means to effect deposition of a visible coating of coloured species derived from the electrochromic material onto said selected display electrodes, and
means to effect deposition of an invisible coating of the coloured species onto all unselected display electrodes,
whereby the potentials of selected and unselected display electrodes are equalised.

2. Apparatus as set forth in claim 1, wherein
said display electrodes are approximately of equal area,
said means to effect deposition of said visible coating effects deposition at a given rate for a given time, and
said means to effect deposition of said invisible coating effects deposition at the given rate for a particular time which is a fixed proportion of said given time.

3. Apparatus as claimed in claim 1 wherein
said display electrodes are of approximately equal area,
are arranged in a first plurality of rows and in a second plurality of columns, and
are each connected to a respective electronic switch having a control electrode responsive to applied potential to control the passage of current through said switch to the related display electrode,
a first plurality of row conductors,
said control electrodes of the respective row being connected to a respective row conductor, and
a second plurality of column conductors, and
a plurality of column drive circuitry units,
said electronic switches are connected through respective column conductors to respective ones of said column drive circuitry units.

4. Apparatus as claimed in claim 3, wherein each column drive circuitry unit includes a bistable circuit with a first stable state and a second stable state, a current source, and a transistor switch connected in series with the respective column conductor and the current source, said transistor switch being adapted to be closed for a time period sufficient to deposit a visible coating of coloured species when the bistable circuit is in said first stable state, and said transistor switch being closed for a time period sufficient only to deposit an invisible coating of coloured species when said bistable circuit is in said second stable state.

* * * * *